(12) United States Patent  (10) Patent No.: US 7,712,307 B2
Braun et al.  (45) Date of Patent: May 11, 2010

(54) EXHAUST GAS SYSTEM, ESPECIALLY FOR AN INTERNAL COMBUSTION ENGINE OF A MOTOR VEHICLE

(75) Inventors: Tillman Braun, Berglen (DE); Detlef Scharr, Leutenbach (DE)

(73) Assignee: Daimler AG, Stuttgart (DE)

( * ) Notice: Subject to any disclaimer, the term of this patent is extended or adjusted under 35 U.S.C. 154(b) by 594 days.

(21) Appl. No.: 11/656,022

(22) Filed: Jan. 19, 2007

(65) Prior Publication Data

US 2009/0031711 A1  Feb. 5, 2009

Related U.S. Application Data

(63) Continuation-in-part of application No. PCT/EP2005/007765, filed on Jul. 16, 2005.

(30) Foreign Application Priority Data

Jul. 24, 2004  (DE) .................. 10 2004 036 036

(51) Int. Cl.
*F01N 3/00*  (2006.01)
(52) U.S. Cl. .............. 60/297; 60/286; 60/287; 60/288; 60/295; 60/301; 60/303
(58) Field of Classification Search ............ 60/285, 60/286, 287, 288, 292, 295, 297, 301, 303, 60/311
See application file for complete search history.

(56) References Cited

U.S. PATENT DOCUMENTS 6,173,568 B1 * 1/2001 Zurbig et al. ............ 60/274
6,192,675 B1 * 2/2001 Hirota et al. ............ 60/286
6,233,927 B1 * 5/2001 Hirota et al. ............ 60/297
6,615,580 B1 * 9/2003 Khair et al. ............ 60/286
6,722,125 B1 * 4/2004 Pfalzgraf ............ 60/295
7,402,292 B2 * 7/2008 Hemingway et al. ..... 423/239.1

FOREIGN PATENT DOCUMENTS

| DE | 101 52 187 | 4/2003 |
| DE | 103 00 298 | 7/2004 |
| EP | 0 907 010 | 4/1999 |
| EP | 1 217 196 | 6/2002 |
| EP | 1 357 267 | 10/2003 |
| WO | WO 97/01387 | 1/1997 |
| WO | WO 99/39809 | 8/1999 |

* cited by examiner

*Primary Examiner*—Binh Q. Tran
(74) *Attorney, Agent, or Firm*—Klaus J. Bach

(57) ABSTRACT

In an exhaust gas system for an internal combustion engine, particularly of a motor vehicle, wherein the exhaust gas system comprises a nitrogen oxide reducing converter arranged in an exhaust gas line of the internal combustion engine, an exhaust gas cleaning device arranged upstream of the nitrogen oxide reducing converter and a reducing agent feed device for feeding a reducing agent into the exhaust gas of the internal combustion engine upstream of the nitrogen oxide reducing converter, a bypass line is provided which branches off from the exhaust gas line upstream of the exhaust gas cleaning device and rejoins the exhaust gas line at an entry point downstream of the exhaust gas cleaning device and upstream of the nitrogen oxide reducing converter.

7 Claims, 2 Drawing Sheets

EXHAUST GAS SYSTEM, ESPECIALLY FOR AN INTERNAL COMBUSTION ENGINE OF A MOTOR VEHICLE

This is a Continuation-in-Part Application of pending International Patent Application PCT/EP2005/007765 filed Jul. 16, 2005 and claiming the priority of German Patent Application 10 2004 036.7 filed Jul. 24, 2004.

BACKGROUND OF THE INVENTION

The invention relates to an exhaust gas system, especially for an internal combustion engine of a motor vehicle, with a nitrogen-reducing converter, an exhaust gas cleaning device and a reduction agent feed device.

WO 99/39809 A1 discloses an exhaust gas system which has arranged in the exhaust line, in the given sequence, an oxidizing converter, a particulate filter and an SCR converter for removing nitrogen oxide from the exhaust gas. Furthermore, a supply of reducing agent for feeding in ammonia or urea solution is provided on the input side of the SCR converter. With this exhaust gas system, particulates and nitrogen oxides and non-combusted fuel constituents can be removed from the exhaust gas of an internal combustion engine. Oxidation of nitrogen monoxide (NO) to nitrogen dioxide ($NO_2$) takes place here to a greater or lesser extent, depending in each case on the exhaust gas conditions, by means of the oxidizing converter. The $NO_2$ formed in turn oxidizes soot deposited in the particulate filter, for a continuous regeneration of the particulate filter. However, both the removal of nitrogen oxide and the removal of soot via $NO_2$ formed are heavily dependent on the prevailing temperature conditions and throughput ratios.

It is the object of the present invention to provide an exhaust gas system for an internal combustion engine, wherein a further improvement in the cleaning of the exhaust gas, in particular over as wide an operating range as possible and during changing operating conditions of the internal combustion engine is achieved.

SUMMARY OF THE INVENTION

In an exhaust gas system for an internal combustion engine, particularly of a motor vehicle, wherein the exhaust gas system comprises a nitrogen oxide reducing converter arranged in an exhaust gas line of the internal combustion engine, an exhaust gas cleaning device arranged upstream of the nitrogen oxide reducing converter and a reducing agent feed device for feeding a reducing agent into the exhaust gas of the internal combustion engine upstream of the nitrogen oxide reducing converter, a bypass line is provided which branches off from the exhaust gas line upstream of the exhaust gas cleaning device and rejoins the exhaust gas line at an entry point downstream of the exhaust gas cleaning device and upstream of the nitrogen oxide reducing converter.

The nitrogen oxide reducing converter is preferably designed as an SCR converter which is suitable for the catalytic conversion of nitrogen oxides with a selective reducing agent. A suitable reducing agent is primarily a liquid medium acting in a reducing manner, such as, for example, a hydrocarbon or a urea and water solution. The exhaust gas cleaning device can comprise one or more further cleaning elements which are suitable for further exhaust gas cleaning.

The at least partial bypassing of the exhaust gas cleaning device makes it possible, firstly, to influence the quantitative flow of exhaust gas through the exhaust gas cleaning device in a specific manner, such that the latter is not over-loaded. Secondly, it is possible to influence the exhaust gas composition of the exhaust gas supplied to the nitrogen oxide reducing converter, and thereby to increase the efficiency thereof. For example, by bypassing the exhaust gas cleaning device connected upstream of the nitrogen oxide reducing converter, the corresponding portion of the exhaust gas flow can have a changed $NO_2$ or TIC content, as a result of which the efficiency of the nitrogen oxide reducing converter can be influenced. Furthermore, the bypass line makes it possible to influence the temperature of the exhaust gas supplied to the nitrogen oxide reducing converter, since the diverted exhaust gas undergoes cooling. Furthermore, a further exhaust gas cleaning element for specific preparation of the corresponding exhaust gas flow can be provided in the bypass line. However, the bypass line is preferably designed as an empty pipe. Furthermore, additives can be fed into, the bypass line which thereby are not subject to undesirable changes caused by the exhaust gas cleaning device. It goes without saying that one or more further exhaust gas cleaning elements, such as, for example, an oxidizing converter in the vicinity of the engine or a nitrogen oxide storage converter can be arranged in the exhaust gas line upstream of the branching-off point and of the exhaust gas cleaning device.

In a particular embodiment of the invention, the reducing agent is fed into the bypass line at the beginning thereof. This permits the reducing agent to be prepared in the bypass line in a manner largely decoupled from the conditions in the exhaust gas line. This avoids a possibly annoying influence, for example in the form of a chemical conversion or in the form of losses by condensation which might be caused, in particular, by exhaust gas cleaning elements in the exhaust gas line. For a further improvement in the preparation of the reducing agent fed into the bypass line, means suitable for this, such as, for example, a mixer, can be provided there.

Preferably, a liquid from which ammonia can be released is provided as the reducing agent. This mal involve a solution of ammonium carbonate or a substance with a similar effect. An aqueous urea solution is preferably provided as the reducing agent. The selected nitrogen oxide reducing agent is introduced into the bypass line via a nozzle arranged at the beginning of the bypass line so that the release of the ammonia can still take place in the bypass line, in particular by means of hydrolysis. In this way, the reducing agent is supplied to the nitrogen oxide reducing converter in an optimally prepared form.

In a refinement of the invention, an adjustable throttle element is arranged in the bypass line. This permits the exhaust gas flow to be controllably divided between the respective exhaust gas branches. It is thereby advantageously possible to influence the heat-up behavior of the various exhaust gas cleaning elements. Furthermore, it is advantageous to provide temperature sensors in the exhaust gas branches and to undertake the activation of the throttle element as a function of the particular temperature conditions in the exhaust gas branches. This permits, for example, a further improvement in the preparation of the reducing agent in the bypass line. The adjustable throttle element is preferably arranged upstream of the reducing agent feed-in point into the bypass line.

Preferably, the exhaust gas cleaning device is a particulate filter and/or as a catalytic converter, in particular, an oxidizing catalytic converter.

This makes it possible, in addition to the removal of nitrogen oxide by means of the nitrogen oxide reducing converter, to undertake further exhaust gas cleaning matched to the particular engine-induced conditions. If the exhaust gas cleaning device is a particulate filter, then it is advantageous if the latter is catalytically coated. This permits, in particular, oxidation-catalytic treatment of the exhaust gas, even without a special converter being provided for this, thus saving construction space. If the exhaust gas cleaning device comprises both a particulate filter and a catalytic converter, preferably an oxidizing catalytic converter, then it is advantageous if the oxidizing converter is arranged at a comparatively small distance on the input side of the particulate filter. This facilitates the heating of the particulate filter during thermal regeneration with heat being produced by exothermic reactions in the oxidizing converter. In the cases mentioned, the possibility of bypassing the particulate filter by means of the bypass line affords advantages in particular in the case of a thermal regeneration of the particulate filter. Firstly, the exhaust gas throughput through the particulate filter can be reduced, which facilitates the regeneration of the particulate filter, and, secondly, the nitrogen oxide reducing converter is less severely heated during regeneration of the particulate filter, thus avoiding thermal damage. Instead of the oxidizing converter or in addition thereto, a nitrogen oxide storage converter may also be provided in each case.

In an internal combustion engine with low particulate emission, a particulate filter may optionally be omitted. In this case the exhaust gas cleaning device is preferably designed as an oxidizing converter. By bypassing the oxidizing converter by means of the bypass line, in particular the $NO_2$ content of the exhaust gas on the input side of the nitrogen oxide reducing converter can be influenced. As a result, the efficiency of the nitrogen oxide reducing converter, which efficiency is dependent, among other things, on the $NO_2$ content, can in turn be improved.

According to a further refinement of the invention, the exhaust gas cleaning device is designed as a catalytic converter, in particular as an oxidizing catalytic converter, and a particulate filter is arranged in the exhaust gas line between the entry point and the nitrogen oxide reducing converter. Therefore both, the catalytic converter can be bypassed and particulates can be removed in the full exhaust gas flow. The bypassing of the catalytic converter by means of the bypass line makes it possible, in particular, to distribute non-combusted fuel constituents in a more specific manner. An improved influencing of heating up of the particulate filter for the thermal regeneration and an influencing of the $NO_2$ content in the exhaust gas on the input side of the nitrogen oxide reducing converter are therefore possible.

In a further refinement of the invention, the exhaust gas cleaning device is designed as a particulate filter and a catalytic converter, in particular an oxidizing catalytic converter, is arranged in the exhaust gas line upstream of the branching-off point. Also in this refinement of the invention, in particular the temperature of the nitrogen oxide reducing converter can be influenced by controlling the quantity of exhaust gas flowing through the bypass line.

The reducing agent is fed preferably into the bypass line and into the exhaust gas line between the entry point and the nitrogen oxide reducing converter. This embodiment permits the division of the metered-in amounts of reducing agent between the partial exhaust gas flow of the bypass line and the full exhaust gas flow. As a result, in the preparation of the reducing agent, the temperature conditions and throughput ratios present in the exhaust gas branches can be taken into consideration.

In a particular embodiment of the invention, the particulate filter is arranged in a first housing and the nitrogen oxide reducing converter is arranged in a second housing. This embodiment ensures flexibility for installation in a motor vehicle. In this case, it may be possible to arrange a further converter in addition to the particulate filter and to the nitrogen oxide reducing converter in both, the first and in the second housing.

The invention will become more readily apparent from the following description of advantageous embodiments thereof described below with reference to the accompanying drawings:

DESCRIPTION OF PREFERRED EMBODIMENTS

Figure 1:
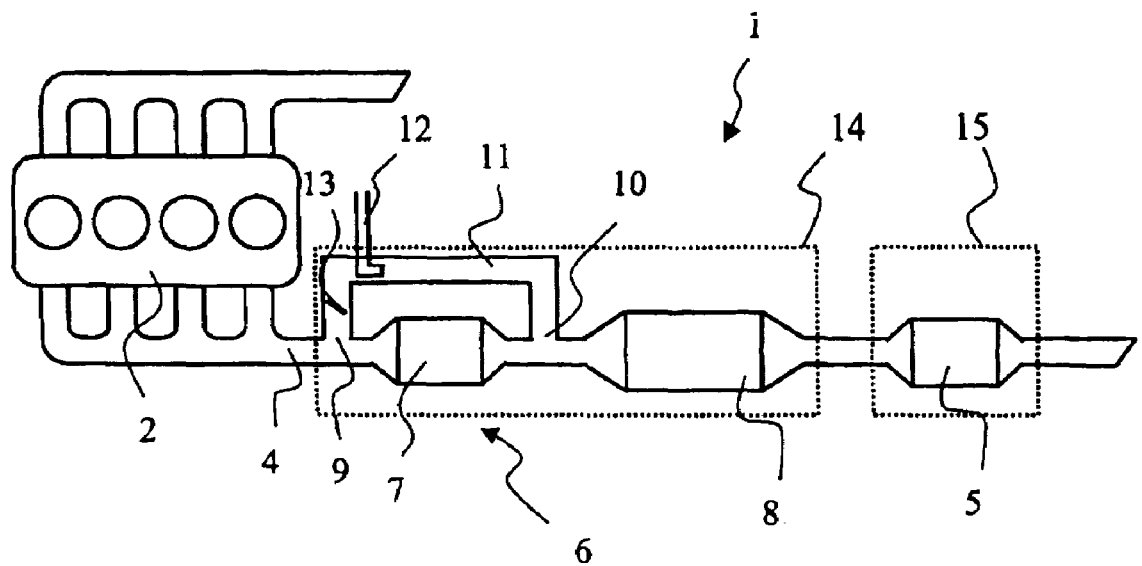
FIG. 1 is a schematic illustration of a first embodiment of the exhaust-gas system according to the invention.

The first preferred embodiment (illustrated schematically in FIG. 1) of the exhaust gas system 1 according to the invention is connected to an internal combustion engine 2 of a motor vehicle (not illustrated) and comprises an exhaust gas cleaning device 6 arranged in an exhaust gas line 4 and a nitrogen oxide reducing converter 5 connected downstream. The internal combustion engine is preferably a diesel engine and the motor vehicle is, in particular, a utility vehicle.

The exhaust gas cleaning device 6 comprises, as the sole exhaust gas cleaning element, a catalytic converter in the form of an oxidizing converter 7. A bypass line 11 is provided for the exhaust gas cleaning device 6, the bypass line 11 branching off from the exhaust gas line 4 at a branching-off point 9 upstream of the oxidizing converter 7 of the exhaust gas cleaning device 6 and rejoining the exhaust gas line 4 again at an entry point 10. An adjustable throttle element 13 arranged in the bypass line 11 permits the exhaust gas flow to be divided between the bypass line 11 and the parallel exhaust gas branch extending through the exhaust gas cleaning device 6. As a further exhaust gas cleaning element, a particulate filter 8 is provided in the exhaust gas line 4 between the entry point 10 and the nitrogen oxide reducing converter 5. The exhaust gas system 1 furthermore comprises a reducing agent feed device 12 for a preferably liquid reducing agent. In this case, the reducing agent feed device 12 is connected in a manner not illustrated specifically to a reducing agent reservoir and to a metering system.

Preferably, as illustrated by a dotted border line, the oxidizing converter 7 and the particulate filter 8 are arranged in a common first housing 14 and the nitrogen oxide reducing converter 5 is arranged in a separate second housing 15. The housings 14, 15 with the components arranged therein act at the same time as sound absorbers. Further sound-absorbing devices may additionally be provided in the housings 14, 15.

It is assumed below that the nitrogen oxide reducing converter 5 is designed as a so-called "SCR converter" (Selective Catalytic Reduction) for the selective reduction of nitrogen oxides by means of ammonia. Accordingly, an aqueous urea solution is preferably fed to the exhaust gas of the diesel engine 2 by the reducing agent feed device 12. However, in particular in the embodiment illustrated in FIG. 1 of the exhaust gas system 1 according to the invention, a where the bypass line rejoins the exhaust line ahead of the particle filter 8, the reducing agent can additionally be fed in, in order to assist in the regeneration of the particulate filter 8. By feeding in the reducing agent via a feed nozzle 12 which is arranged near the beginning of the bypass line 11 and by which the reducing agent is sprayed into the bypass line 11 in a finely distributed manner the reducing agent, that is the aqueous urea solution is intensely mixed with the exhaust gas in the bypass line 11 and sufficient time is provided for the release of the ammonia from the aqueous urea solution.

Although the particulate filter 8 in principle can have an oxidation-catalytically effective coating, in the embodiment illustrated in FIG. 1 it is preferred if an uncoated particulate filter is used. This largely avoids urea or ammonia being oxidized as they are passed across the particulate filter.

Figure 2:
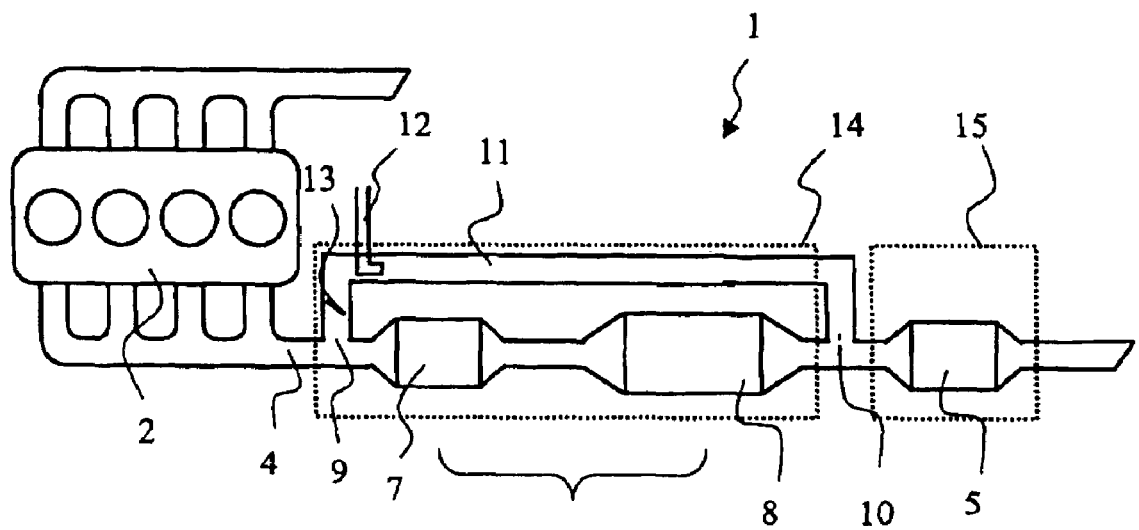
FIG. 2 is a schematic illustration of a second embodiment of the exhaust gas system according to the invention.

FIG. 2 illustrates a further advantageous embodiment of the exhaust gas system 1, where the corresponding components, if they coincide with the parts of FIG. 1, are identified by the same reference numbers. The exhaust gas system illustrated in FIG. 2 is constructed in a similar manner to the exhaust gas system of FIG. 1, and therefore only the differences are discussed below.

The exhaust gas cleaning device 6 of the exhaust gas system 1 according to FIG. 2 comprises a catalytic converter 7, which is an oxidizing catalytic converter, and a particulate filter 8 connected downstream of the catalytic converter 7. The entry point 10 of the bypass line 11 bypassing the exhaust gas cleaning device 6 is therefore arranged between the particulate filter 8 and the nitrogen oxide reducing converter 5. In comparison to the arrangement illustrated in FIG. 1, a greater length of line is therefore available for preparing the reducing agent. In addition, in contrast to the arrangement according to FIG. 1, the reducing agent serving for the reduction of nitrogen oxide does not have to be transported through the particulate filter 8, which may likewise be an advantage.

Figure 3:
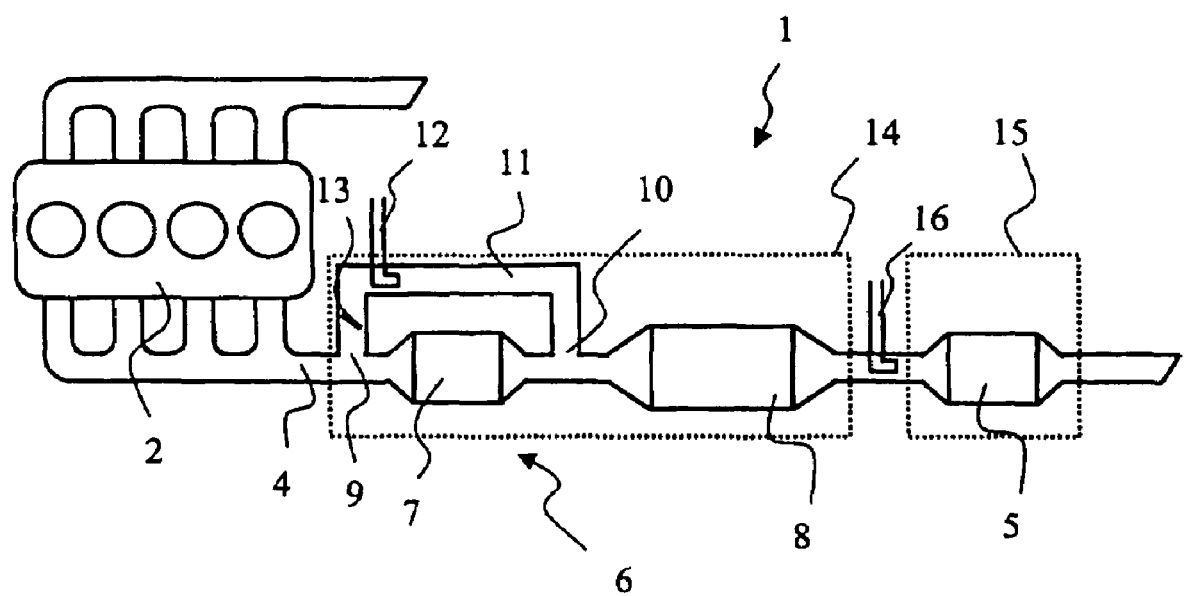
FIG. 3 is a schematic illustration of a third embodiment of the exhaust gas system according to the invention.

FIG. 3 illustrates a further advantageous embodiment of the exhaust gas system 1, where the corresponding components, if they correspond to the parts of FIGS. 1 to 3, are identified by the same reference numbers.

The exhaust gas system 1 illustrated in FIG. 3 differs from the exhaust gas system of FIG. 1 by virtue of a second reducing agent feed device 16 on the input side of the nitrogen oxide reducing converter 5. This permits the optional feeding of the reducing agent, firstly, at a point remote from the nitrogen oxide reducing converter 5 into the partial exhaust gas flow conducted through the bypass line 11 and, secondly, at a point situated close to the nitrogen oxide reducing converter 5 into the full exhaust gas flow. In this case, different reducing agents may also be provided for the first reducing agent feed device 12 and the second reducing agent feed device 16.

The operation of the exhaust gas system according to the invention is discussed below with reference to FIGS. 1 to 3. It is noted however that further components, in particular sensors for pressure and temperature, are arranged in the exhaust gas systems (merely illustrated schematically), in order to detect and to control the operating state of the exhaust gas system.

Means are provided for detecting the temperatures of the oxidizing converter 7, of the particulate filter 8 and of the nitrogen oxide reducing converter 5 and, via the throttle element 13, the partial exhaust gas flow conducted through the bypass line 11 is controlled in particular as a function of these temperatures. If it is established, for example, that the temperature of the nitrogen oxide reducing converter 5 is below a predetermined limit temperature, then the throttle element 13 is largely opened and virtually all of the exhaust gas flow is conducted through the bypass line 11. The limit temperature is preferably defined via the operating temperature window of the nitrogen oxide reducing converter. In this manner, in particular during a cold start of the internal combustion engine 2, the nitrogen oxide reducing converter 5 can be rapidly heated, since heat losses are avoided in the oxidizing converter 7 and in the particulate filter 8. The nitrogen oxide reducing converter 5 therefore reaches its correct operating temperature comparatively rapidly. When this is achieved, the metering of the reducing agent is started. The setting of the quantity can take place here, controlled by a characteristic diagram, in accordance with the concentration of nitrogen oxide in the exhaust gas and the efficiency of the nitrogen oxide reducing converter 5 or on the basis of a sensor. At the same time, the bypass line 11 is largely closed by actuation of the throttle element 13, so that now a comparatively small portion of the exhaust gas flow flows through the bypass line 11. Therefore, after the operating temperature of the nitrogen oxide reducing converter 5 is reached, both a particulate filtering of the entire exhaust gas flow and an effective removal of the nitrogen oxide are therefore made possible. In addition, the residence time, which is increased on account of the reduced throughput, permits effective preparation of the reducing agent or hydrolysis of urea in the bypass line.

In a similar manner, provision may also be made to use the temperature of the oxidizing converter 7 to control the opening of the bypass line 11. For example, provision may be made to determine the effectiveness of the oxidizing converter 7 by detecting the temperatures present at the input side and the output side. If it is established that there is no development of heat in the oxidizing converter, then the bypass line 11 is opened relatively wide. A comparatively large quantity of exhaust gas, with heat losses being avoided, reaches the nitrogen oxide reducing converter 5, with the result that the latter is rapidly heated to the operating temperature.

Since the effectiveness of the nitrogen oxygen reducing converter 5 is typically dependent on the concentration ratio of $NO_2$ to NO in the exhaust gas, provision may furthermore be made to control the opening of the bypass line 11 as a function of this ratio. For the information, required for this purpose, regarding the $NO_2$ and NO concentration ratios a characteristic diagram, for example, can be provided which preferably takes the momentary engine operating point and the temperature of the oxidizing converter 7 and/or of the particulate filter 8 into account. By corresponding activation of the throttle element 13, the exhaust gas flow is divided in such a way that a greater or lesser proportion of the NO contained in the exhaust gas is oxidized in the oxidizing converter 7 to form $NO_2$. A concentration ratio of $NO_2$ to NO, favorable for the conversion of nitrogen oxide, can thereby be set on the input side of the nitrogen oxide reducing converter 5. A ratio of one to one is preferably sought.

For the embodiment illustrated in FIG. 3, provision is made to undertake the division of the metered-in quantity of urea between the first reducing agent feed device 12 and the second reducing agent feed device 16 preferably as a function of the temperature of the particulate filter 8. In particular, it is advantageous, above a specifiable limit temperature for the particulate filter 8, to undertake a metering of urea predominantly or exclusively by means of the second reducing agent feed device 16. This avoids urea or ammonia being oxidized in the particulate filter 8. This is advantageous in particular if a catalytically coated particulate filter 8 is used.

In particular for the embodiment of FIG. 3, in addition to the metering of urea, a metering of hydrocarbons via the first reducing agent feed device 12 into the bypass line 11 can also be provided. This assists the thermal regeneration of the particulate filter in particular in the case of a catalytically coated particulate filter 8. The temperature of the particulate filter can be set here in an advantageous manner via the actuation of the throttle element 13, just as generally the temperatures of the exhaust gas cleaning elements 5, 7, 8 of the exhaust gas system 1 can be influenced by a division of the exhaust gas flows by appropriate setting of the throttle element 13.

It is noted that, in particular in the case of a particulate filter 8, which is provided with an oxidation-catalytically effective coating, instead of an oxidizing converter for the catalytic converter 7, another type of catalytic converter, such as, for example, a nitrogen oxide storage converter, may also be provided. Furthermore, the particulate filter 8 and the nitrogen oxide reducing converter 5 may comprise a plurality of separate components preferably provided in a parallel flow arrangement.

What is claimed is:

1. An exhaust gas system (1), for an internal combustion engine (2), including:
   a nitrogen oxide reducing converter (5) in the form of an SCR converter for the Selective Catalystic Reduction of nitrogen oxides by means of ammonia arranged in an exhaust gas line (4) of the internal combustion engine (2),
   an exhaust gas cleaning device (6) arranged in the exhaust gas line (4) upstream of the nitrogen oxide reducing converter (5),
   a bypass line (11) branching off from the exhaust gas line (4) at a branching-off point (9) upstream of the exhaust gas cleaning device (6), and rejoining the exhaust gas line (4) at an entry point (10) downstream of the exhaust gas cleaning device (6) and upstream of the nitrogen oxide reducing converter (5), and
   a reducing agent feed device (12) arranged in the bypass line (11) near the branching off point (9) for feeding a reducing agent consisting of an ammonia-releasing liquid into the exhaust gas of the internal combustion engine (2) at the up-stream end of the bypass line (11) so as to provide sufficient time for the release of the ammonia from the ammonia releasing liquid into the exhaust gas within the bypass line (11).

2. The exhaust gas system (1) as claimed in claim 1, wherein an adjustable throttle element (13) is arranged in the bypass line (11).

3. The exhaust gas system (1) as claimed in claim 1, wherein the exhaust gas cleaning device (6) comprises at least one of a particulate filter (8) and a catalytic converter (7).

4. The exhaust gas system (1) as claimed in claim 3, wherein the exhaust gas cleaning device (6) comprises a catalytic converter (7) and a particulate filter (8) which is arranged in the exhaust gas line (4) between the entry point (10) and the nitrogen oxide reducing converter (5).

5. The exhaust gas system (1) as claimed in claim 1, wherein an additional reducing agent feed device (16) is connected to the exhaust gas line (4) upstream of the nitrogen oxide reducing catalytic converter (5) for feeding ammonia releasing liquid into the nitrogen oxide reducing converter (5).

6. The exhaust gas system (1) as claimed in claim 1, wherein the exhaust gas cleaning device (6) is arranged in a first housing (14) and the nitrogen oxide reducing converter (5) is arranged in a second housing (15).

7. The exhaust as system as claimed in claim 1, wherein the catalytic converter (7) included in the exhaust gas cleaning device (6) is an oxidizing catalytic converter.

* * * * *